(12) United States Patent
Yokokawa et al.

(10) Patent No.: US 10,375,298 B2
(45) Date of Patent: Aug. 6, 2019

(54) IMAGING APPARATUS

(71) Applicant: Olympus Corporation, Hachioji-shi, Tokyo (JP)

(72) Inventors: Ko Yokokawa, Tokyo (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/058,998

(22) Filed: Aug. 8, 2018

(65) Prior Publication Data

US 2018/0352151 A1 Dec. 6, 2018

Related U.S. Application Data

(62) Division of application No. 15/782,834, filed on Oct. 12, 2017, now Pat. No. 10,075,632, which is a (Continued)

(30) Foreign Application Priority Data

Feb. 2, 2015 (JP) .................................. 2015-018806

(51) Int. Cl.
*H04N 5/232* (2006.01)
*H04N 5/374* (2011.01)

(52) U.S. Cl.
CPC ..... *H04N 5/23222* (2013.01); *H04N 5/23245* (2013.01); *H04N 5/23258* (2013.01); (Continued)

(58) Field of Classification Search
CPC ..... G06T 1/20; G06T 3/4015; H04N 5/23245; H04N 5/374; H04N 9/8042; H04N 19/42
See application file for complete search history.

(56) References Cited

U.S. PATENT DOCUMENTS 7,349,020 B2 * 3/2008 Stavely .................. H04N 5/232
348/239
7,973,848 B2 * 7/2011 Koh .................... G06K 9/00221
348/333.02
(Continued)

FOREIGN PATENT DOCUMENTS

CN 103384304 11/2013
CN 104094588 10/2014
(Continued)

OTHER PUBLICATIONS

Restriction/Election Requirement issued in ancestor U.S. Appl. No. 15/004,483, dated Apr. 18, 2017 (5 pgs.).
(Continued)

*Primary Examiner* — Hung H Lam
(74) *Attorney, Agent, or Firm* — John C. Pokotylo; Pokotylo Patent Services

(57) ABSTRACT

An imaging apparatus includes: an image comparing unit that compares a shot image shot by a photographer with a sample image selected by the photographer; an operation comparing unit that compares an operation performed when the shot image was shot with an operation performed when the sample image was shot; and an advising unit that gives the photographer advice on an image shooting method to make the shot image close to the sample image according to comparison results provided by the image comparing unit and the operation comparing unit.

6 Claims, 11 Drawing Sheets

Related U.S. Application Data division of application No. 15/004,483, filed on Jan. 22, 2016, now Pat. No. 9,843,721.

(52) U.S. Cl.
CPC ..... *H04N 5/23261* (2013.01); *H04N 5/23293* (2013.01); *H04N 5/374* (2013.01)

(56) References Cited

U.S. PATENT DOCUMENTS

| | | | |
|---|---|---|---|
| 8,698,937 | B2 | 4/2014 | Jeong |
| 9,237,273 | B2 | 1/2016 | Maruyama et al. |
| 9,270,901 | B2 | 2/2016 | Iki |
| 9,497,384 | B2 | 11/2016 | Panek-Rickerson |
| 10,091,414 | B2* | 10/2018 | Chan ................. H04N 5/23222 |
| 2004/0174434 | A1 | 9/2004 | Walker et al. |
| 2004/0186820 | A1* | 9/2004 | Izume ................... G06F 16/51 |
| 2005/0088542 | A1 | 4/2005 | Stavely et al. |
| 2012/0162387 | A1 | 6/2012 | Sakurai et al. |
| 2013/0293746 | A1 | 11/2013 | Iki |
| 2014/0368716 | A1 | 12/2014 | Maruyama et al. |
| 2015/0098000 | A1* | 4/2015 | Gosangi ............ H04N 5/23293 348/333.02 |
| 2016/0104284 | A1 | 4/2016 | Maguire et al. |
| 2017/0289573 | A1 | 10/2017 | Yoo et al. |

FOREIGN PATENT DOCUMENTS

| | | |
|---|---|---|
| JP | 2006-014119 | 1/2006 |
| JP | 2010-068207 | 3/2010 |
| JP | 2011-188318 | 9/2011 |
| JP | 2013-232861 | 11/2013 |
| JP | 2014-17865 | 1/2014 |

OTHER PUBLICATIONS

Notice of Allowance issued in ancestor U.S. Appl. No. 15/004,483, dated Jul. 13, 2017 (27 pgs.).

First Office Action from corresponding Chinese Patent Application Serial No. 201610028505.8 (5pgs.), dated Sep. 5, 2017, with translation (8 pgs.).

Notice of Allowance issued in parent U.S. Appl. No. 15/782,834, dated May 10, 2018 (18 pgs.).

Notification of Reasons for Refusal from corresponding Japanese Patent Application Serial No. 2015-018806, dated Oct. 23, 2018, (4 pgs.), with translation (3 pgs.).

* cited by examiner

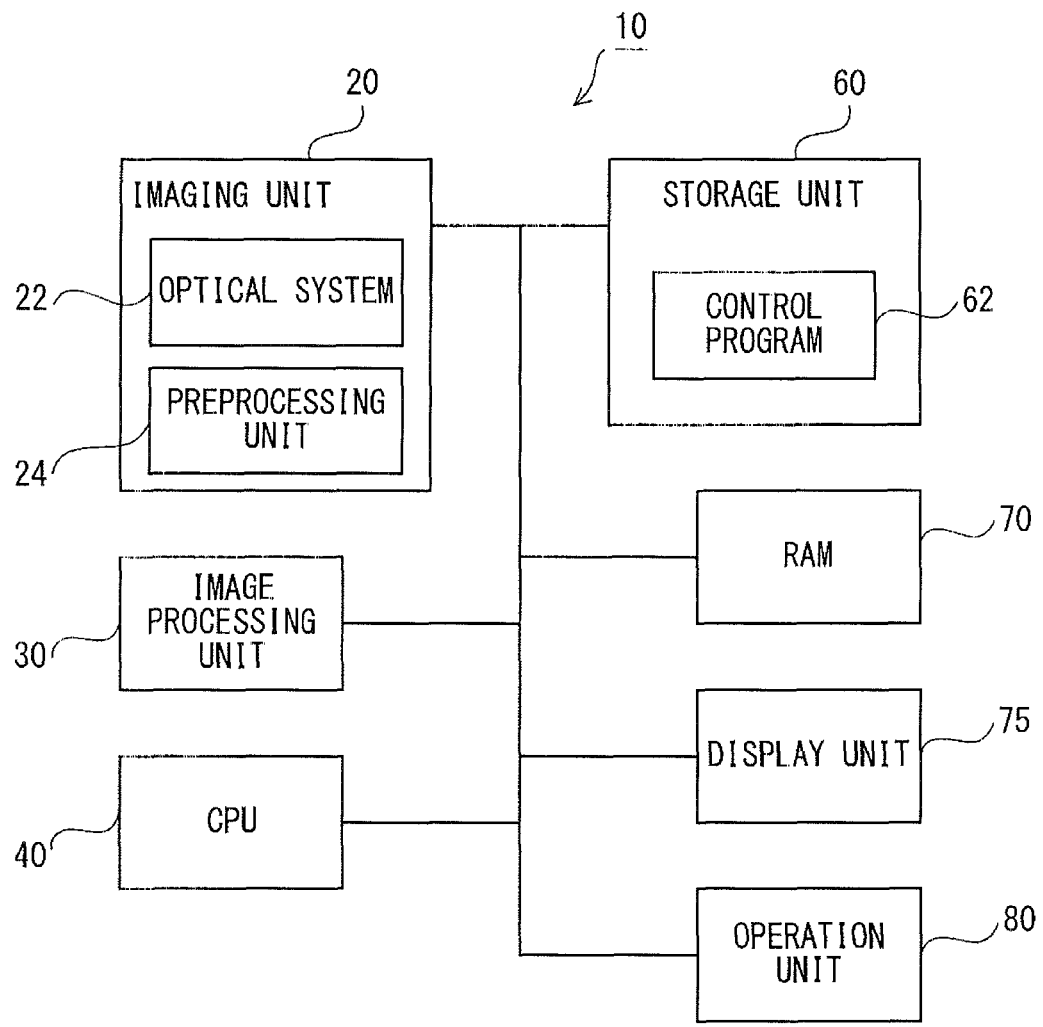
F I G. 1

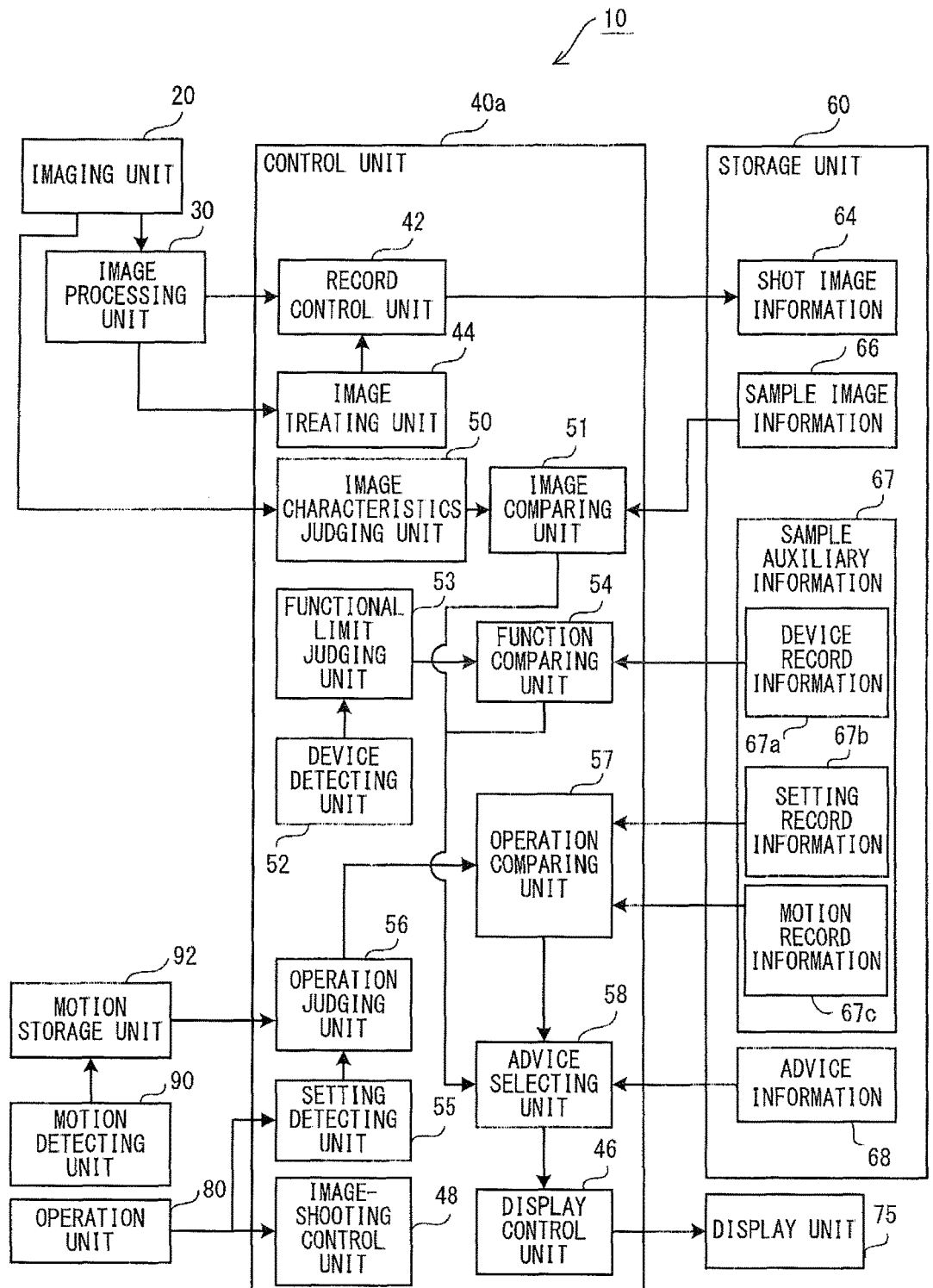
F I G. 2

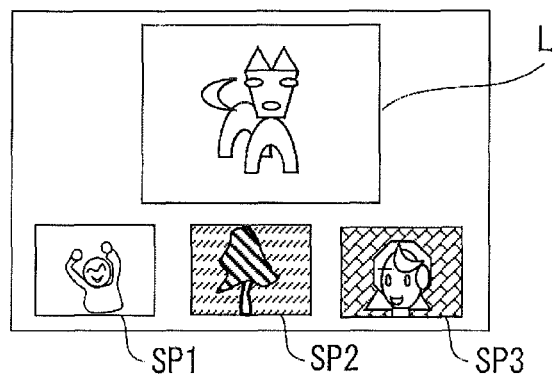
F I G. 6

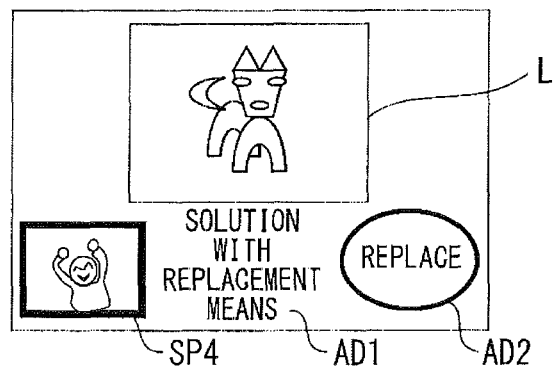
F I G. 7

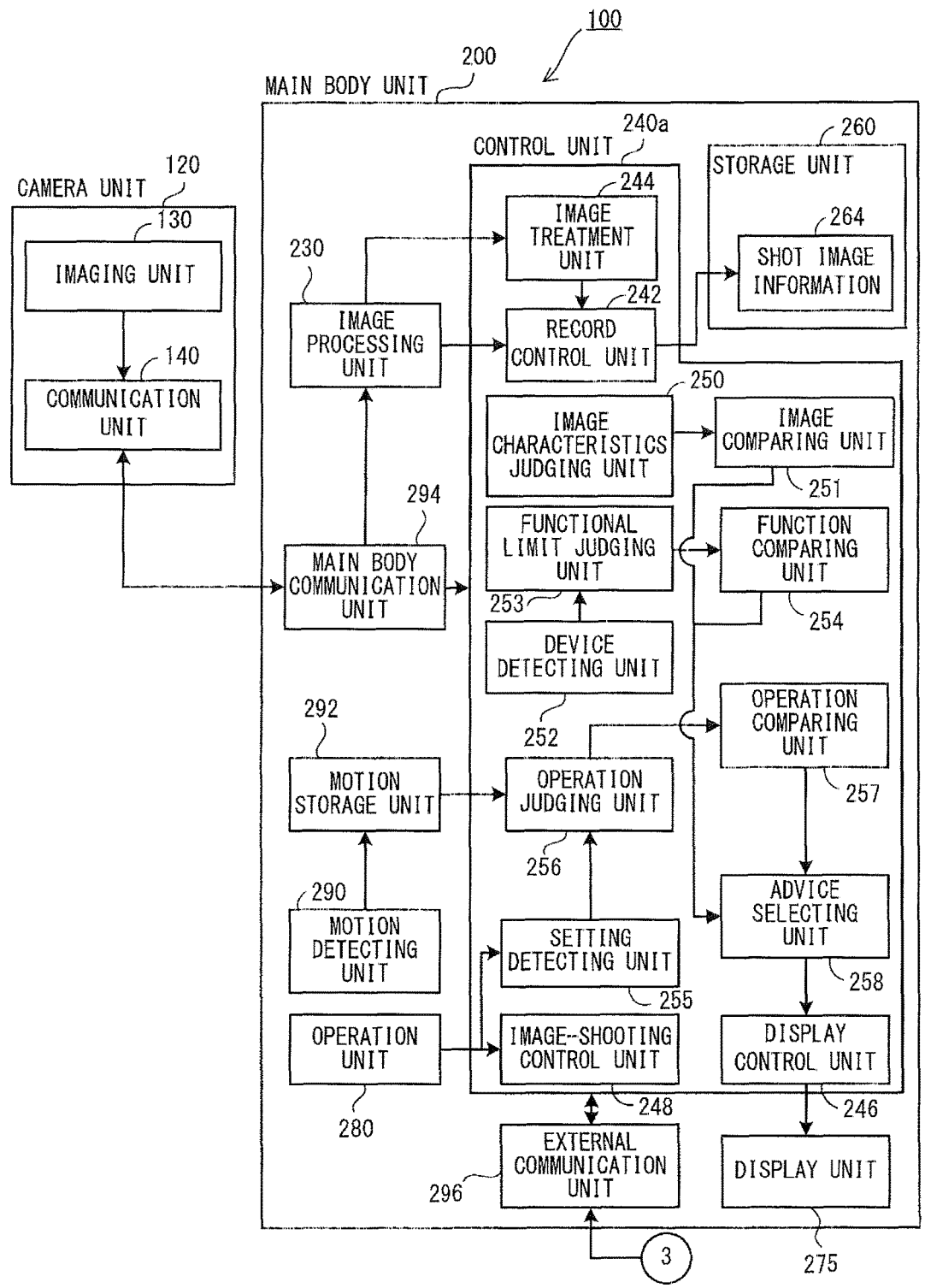
F I G. 9 A

IMAGING APPARATUS

RELATED APPLICATIONS

This application is a divisional application of U.S. patent application Ser. No. 15/782,834 (referred to as "the '834 application" and incorporated herein by reference), filed on Oct. 12, 2017, titled "IMAGING APPARATUS," listing Ko YOKOKAWA, and Osamu NONAKA as the inventors, the '834 application being a divisional application of U.S. patent application Ser. No. 15/004,483 (referred to as "the '483 application" and incorporated herein by reference), filed on Jan. 22, 2016, titled "IMAGING APPARATUS," listing Ko YOKOKAWA, and Osamu NONAKA as the inventors, and issuing on Dec. 12, 2017 as U.S. Pat. No. 9,843,721, the '483 application claiming benefit of Japanese Application No. 2015-018806 filed in Japan on Feb. 2, 2015, the contents of which are incorporated by this reference.

BACKGROUND OF THE INVENTION

Field of the Invention

The present invention relates to an imaging apparatus that allows a user to shoot an image that is close to a desired sample.

Description of the Related Art

The quality of a shot image of an object largely depends on settings for image shooting, actions for image shooting, or an image shooting device to be used. However, it is difficult for beginners to figure out what device should be used or what condition is preferable to shoot an image of an object.

For example, the quality of a shot image may depend on the combination of an image shooting device and various parameter values thereof (e.g., ISO sensitivity, compressibility, presence/absence of flash, and luminance value). However, it is difficult for a beginner to choose a proper device, including an accessory, and to adjust each parameter so as to achieve a desired image quality.

In shooting an image, image-shooting composition is an important factor, but a great deal of experience is required to adequately use, hold, and grasp a device, to determine a posture at which an image is shot, and to set the angle of view to suit a subject or the situation. Patent document 1 (Japanese Laid-open Patent Publication No. 2014-17865) proposes as one solution an imaging apparatus that gives advice on a posture at which an image is shot so that even a beginner can set a proper image-shooting composition.

SUMMARY OF THE INVENTION

As described in patent document 1, when an ideal example (sample) image shot by a professional photographer is presented, a user may become eager to shoot a similar such image. However, an ideal example image is different from an actual subject and background that a photographer may be attempting to photograph, and the photographer will not necessarily be using an image shooting device that is identical with the device used to shoot the ideal example image. When a beginner wishes to shoot an image close to an ideal example image, she/he does not know, in many cases, how to shoot such an image. To solve this problem, it is necessary to provide, in accordance with each individual situation, specific advice that is not limited to simple advice on parameter settings for shooting an image close to an ideal example image.

In view of the problem described above, an object of the invention is to provide an imaging apparatus that provides total support for image shooting so that an image close to an ideal example image can be shot.

To attain the object above, an imaging apparatus that includes at least an imaging unit, an operation unit, and a display unit for displaying an image includes: a display controlling unit that controls an image to be displayed on the display unit; an image comparing unit that compares a shot image shot by a photographer with a sample image selected by the photographer; an operation comparing unit that compares an operation performed when the shot image was shot with an operation performed when the sample image was shot; and an advising unit that gives the photographer advice on an image shooting method to make the shot image close to the sample image according to comparison results provided by the image comparing unit and the operation comparing unit.

BRIEF DESCRIPTION OF DRAWINGS

FIG. 1 is a hardware configuration diagram of an imaging apparatus in accordance with a first embodiment of the invention;

FIG. 2 is a functional block diagram related to an advising process in accordance with the first embodiment;

FIG. 6 is an exemplary screen displayed in step S22;

FIG. 7 illustrates an exemplary screen on which a special effect is displayed as advice;

FIG. 9A is a system diagram illustrating a configuration in accordance with a second embodiment.

DETAILED DESCRIPTION OF THE PREFERRED EMBODIMENTS

Figure 3A:
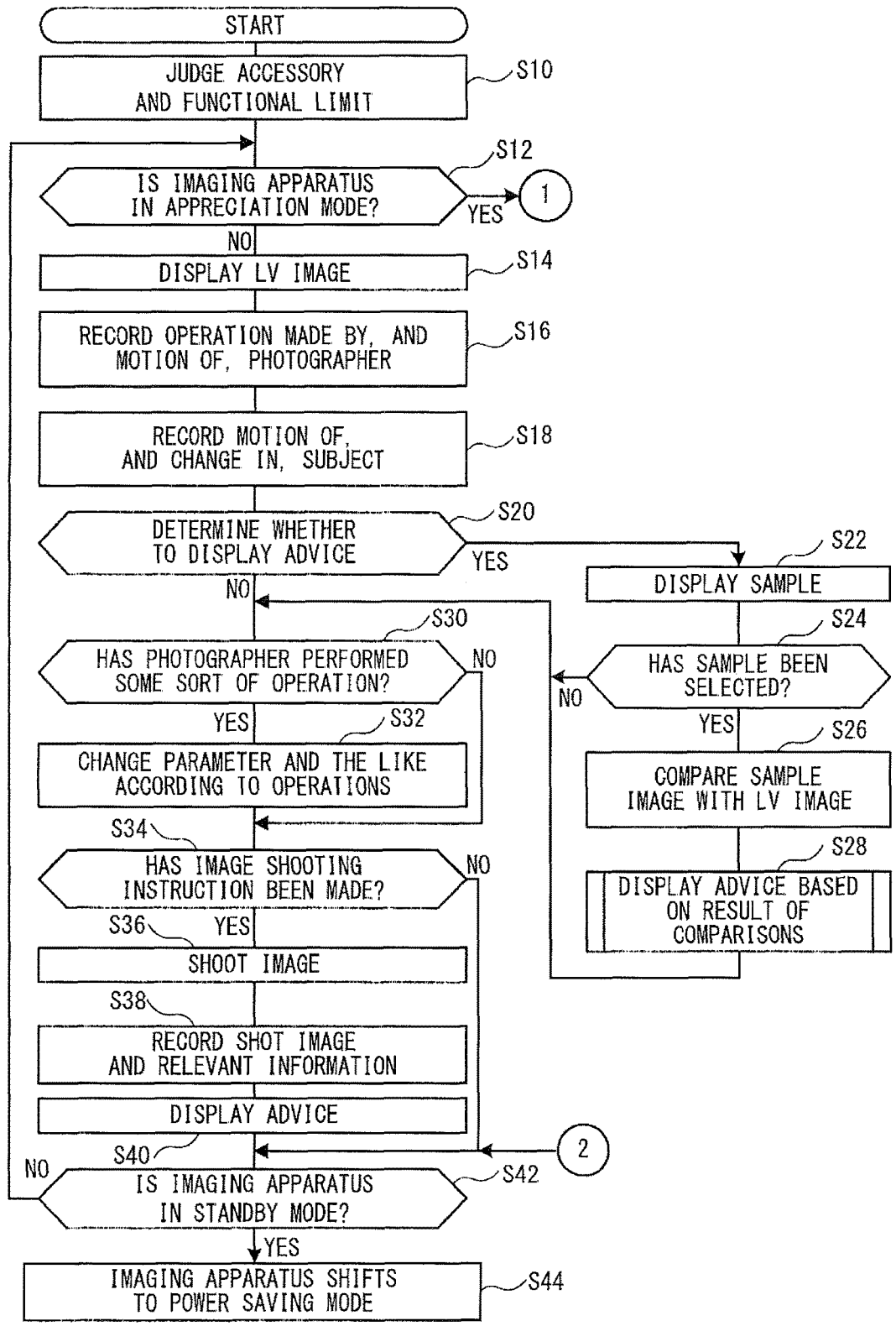
FIG. 3A is a flowchart 1 illustrating a procedure for an advice displaying process.

The following will describe embodiments of the invention with reference to the drawings.

First Embodiment

FIG. 1 is a hardware configuration diagram of an imaging apparatus 10 in accordance with a first embodiment of the invention. The imaging apparatus 10, which is also called a digital camera, is capable of shooting both moving images and still images.

The imaging apparatus 10 includes: an imaging unit 20 that converts a subject image into image data and outputs the image data; an image processing unit 30 that applies processing such as AWB (Auto White Balance) to the image data; a CPU 40 that comprehensively controls the entirety of the imaging apparatus 10; a storage unit 60 that stores, for example, shot image data and a sample image (this will be described hereinafter) in a nonvolatile manner; a RAM 70 that temporarily stores image data and a program; a display unit 75 that displays a shot image and various types of information; and an operation unit 80 to which a setting and condition for the imaging apparatus 10 are input.

An image output to check composition during an image shooting mode will hereinafter be referred to as a live view image (LV image), and an image shot and saved in the storage unit 60 will hereinafter be referred to as a shooting-completed image so as to clarify a difference between these images. Live view images and shooting-completed images may hereinafter be collectively referred to as shot images.

The imaging unit 20 includes: an optical system 22 that forms a subject image; and a preprocessing unit 24 that includes an imaging element to perform photoelectric conversion of a formed optical image, and that performs AD (Analog-to-digital) conversion and/or AGC (Automatic Gain Control) of an image signal from the imaging element. The storage unit 60 stores, together with image data, a control program 62 to be executed by the CPU 40. The operation unit 80 includes a release button for giving an instruction to shoot an image and a dial for setting image shooting conditions or includes a button for adjusting a zoom ratio.

FIG. 2 is a functional block diagram related to an advice displaying process achieved by the imaging apparatus 10. A control unit 40a is a functional unit achieved by the CPU 40 that has read the control program 62. The imaging apparatus 10 is provided with a motion detecting unit 90 and a motion storage unit 92.

The motion detecting unit 90 includes an acceleration sensor and detects the motion of the imaging apparatus 10 according to an output from the acceleration sensor. The motion detecting unit 90 may use a blurring detection sensor. Motion information output from the motion detecting unit 90 is successively stored in the motion storage unit 92. The motion storage unit 92 may be a portion of the RAM 70. The postures and motions of the imaging apparatus 10 that are made during a predetermined time period (e.g., 5 seconds) are stored in the motion storage unit 92.

The storage unit 60 is a memory that stores data in a nonvolatile manner, e.g., a HDD or a flash memory. In addition to the control program 62 described above, the storage unit 60 stores various pieces of data such as shot image information 64, sample image information 66, sample auxiliary information 67, and advice information 68. Shot image information 64 is data on a shooting-completed image and is also information on a shot image recorded by the control unit 40a.

Sample image information 66 is data on a sample image shot and recorded in advance. A sample image is an image presented to a photographer as an ideal example and will also be hereinafter referred to as an ideal example image. A sample image may be an image shot by a professional cameraman; alternatively, it may be an image shot by an amateur cameraman and obtained over a network, or may be an image shot and registered as a sample image by a user herself/himself.

Sample auxiliary information 67 includes various pieces of data such as device record information 67a, setting record information 67b, and motion recording information 67c. Device record information 67a is information that records an imaging apparatus used to shoot a sample image. Setting record information is information that records a setting operation performed on the imaging apparatus when a sample image was shot. Motion record information 67c is information that records a motion of the imaging apparatus made when a sample image was shot.

Advice information 68 is information on a specific image shooting method that is used to make a shot image close to a sample image. Advice information 68 includes, for example, "increase sensitivity", "get closer", "move fast", "set high-speed shutter", and "change device".

The control unit 40a includes, as functional units, a record control unit 42, an image treating unit 44, a display control unit 46, an image-shooting control unit 48, an image characteristics judging unit 50, an image comparing unit 51, a device detecting unit 52, a functional limit judging unit 53, a function comparing unit 54, a setting detecting unit 55, an operation judging unit 56, an operation comparing unit 57, and an advice selecting unit 58.

The record control unit 42 performs control such that image data output from the image processing unit 30 is recorded in the storage unit 60 as a shooting-completed image (saved image). The image treating unit 44 treats a shot image (a live view image or shooting-completed image) according to an instruction from a photographer made using the operation unit 80. In particular, the image treating unit 44 performs special effect processing and/or special shooting. The display control unit 46 displays, on the display unit 75, a processed or treated live view image or shooting-completed image, image shooting information or an image shooting menu, and the like.

The image-shooting control unit 48 controls image shooting conditions (e.g., image shooting mode, image-shooting start instruction, zoom ratio, sensitivity setting, and image quality setting) according to a setting of the operation unit 80. The image-shooting control unit 48 also controls an AE (Automatic Exposure) unit and an AF (Automatic Focus) unit, neither of which is illustrated.

The image characteristics judging unit 50 judges "shot-image characteristics". The "shot-image characteristics" include the type of a subject (e.g., child, male, female, animal, flower, and building), the distance, luminance, and hue of a main subject, the composition of the main subject, the luminance, hue, and resolution of a background, and the like. The image characteristics judging unit 50 judges characteristics of an image using image data output from the imaging unit 20, but may judge characteristics of an image using an image processed by the image processing unit 30. In addition, the image characteristics judging unit 50 may judge characteristics of the image using a shooting-completed image, rather than a live view image.

The image comparing unit 51 compares "image characteristics" of a sample image selected by a photographer with "shot-image characteristics". In particular, the image comparing unit 51 compares "shot-image characteristics" judged by the image characteristics judging unit 50 with image characteristics of sample image information 66 so as to determine whether the category of the image of a subject is identical with that of the sample image and whether the color tone and luminance of the subject is equivalent to those of the sample image.

The device detecting unit 52 detects the types of a flash and interchangeable lens mounted on the imaging apparatus 10. The functional limit judging unit 53 judges limits of functions of the imaging apparatus 10 (shutter speed, range of a diaphragm, and brightness of a lens) according to device information detected by the device detecting unit 52.

The function comparing unit 54 compares a function of the imaging apparatus 10 with a function of an imaging apparatus used to shoot a sample image. The function comparing unit 54 compares a judgement result provided by the functional limit judging unit 53 with device record information 67*a*.

The setting detecting unit 55 detects, for example, an image shooting condition set for the imaging apparatus 10. The setting detecting unit 55 detects various settings according to settings input to the operation unit 80. The operation judging unit 56 judges an "operation performed during image shooting" of a shot image according to the motion storage unit 92 and the setting detecting unit 55. In particular, the operation judging unit 56 judges an "operation performed during image shooting" according to both an "operation for making settings of imaging apparatus (hereinafter referred to as "setting operation")" performed by the operation unit 80 and a "motion made during image shooting" of the imaging apparatus.

The "operation for making settings of imaging apparatus (setting operation)" is an operation related to the setting of image shooting conditions (e.g., image shooting mode, image-shooting start instruction, zoom ratio, sensitivity setting, and image quality setting). The "motion made during image shooting" of the imaging apparatus means, for example, the way the imaging apparatus is held (e.g., upward, downward) and the way the imaging apparatus is moved (the speed and direction of panning). The way the imaging apparatus is moved is important in, in particular, performing panoramic shooting and panning shooting.

The way the imaging apparatus is held or moved is judged using motion information output from the motion detecting unit 90. The operation judging unit 56 may judge an "operation performed during image shooting" using only one of "setting operation" or "motion made during image shooting". When, for example, a shot image for which an "operation performed during image shooting" has been obtained is not affected, the operation judging unit 56 may make a judgement using the "setting operation" alone.

The operation comparing unit 57 compares the "operation performed during image shooting" of the imaging apparatus 10 that has been judged by the operation judging unit 56 with the setting record information 67*b* and motion record information 67*c* of a sample image. In particular, the operation comparing unit 57 contrasts the "setting operation" performed on the imaging apparatus 10 with setting record information 67*b*, and contrasts the "motion made during image shooting" of the imaging apparatus 10 with motion record information 67*c*.

According to each of the results of the comparing performed by the image comparing unit 51, the function comparing unit 54, and the operation comparing unit 57, the advice selecting unit 58 selects and determines, from among advice information 68 within the storage unit 60, advice related to an image shooting method recommended to make the shot image close to the sample image.

The display control unit 46 displays the selected and determined advice information on the display unit 75. The advice selecting unit 58 may also be referred to as an advice unit. The advice selecting unit 58 may generate advice to be displayed, by combining or arranging a plurality of pieces of advice information.

As described above, comparing image information obtained by the imaging unit with a sample image, comparing features of two images, judging a similarity and a difference, and giving advice such that a user performs an operation to decrease the difference would allow the user to obtain, observe, and shoot an image that is close to a sample image (an image close to an image desired by the user). To give more proper advice, conditions different from the image conditions described above also need to be considered in addition to the comparison between a current image and a sample image. The following describes the conditions different from the image conditions described above.

First, consideration is given to the result of the comparing of device functions that is provided by the function comparing unit 54. An image is limited by the functions and capability of a device, a cooperative device, an accessory, or the like. Accordingly, the function comparing unit 54 compares a device in use (function and performance limit) with a device for a sample image by detecting an image shooting device.

Second, consideration is given to the result of comparing of "setting operations" that is provided by the operation comparing unit 57. In particular, consideration is given to the result of the comparing of various parameters of the imaging apparatus 10 and various parameters of an imaging device used for the sample image (setting record information 67*b* of sample auxiliary information 67).

Third, consideration is given to the result of the comparing of "motions made during image shooting" that is provided by the operation comparing unit 57. Simply setting the same parameters as those for the sample image, simply using the same device or cooperative apparatus such as an accessory as that for the sample image, or simply using the same system as that used for the sample image does not necessarily allow an image similar to the sample image to be shot. Some observations and image shooting operations can be performed finally after the imaging apparatus, an apparatus, and a cooperative device are properly operated. In such image shooting operations, motion information of the imaging apparatus 10 needs to be checked against motion record information 67*c* included in sample auxiliary information 67.

Performing, as described above, the comparing of operations such as "setting operations" and "motion made during image shooting" in addition to the comparing of images performed by the image comparing unit 51 enables the advice selecting unit 58 to increase the accuracy of advice. According to sample auxiliary information 67, i.e., information on operations performed when a sample image was shot, an imaging apparatus may be used that gives advice by comparing operations and operation processes for shooting the sample image with those for shooting a shot image, so that image shooting and observation can be enjoyed by sharing the know-how to capture (shoot) images.

The advice selecting unit 58 does not necessarily need to determine advice according to all of the following items: image comparison, functional comparison, and operation comparison (setting operations or motions made during image shooting).

The advice selecting unit 58 may choose an item to be compared as appropriate. For example, the advice selecting unit 58 may select advice according to only the image comparison and the functional comparison, or may select advice according to individual sample images.

Figure 3B:
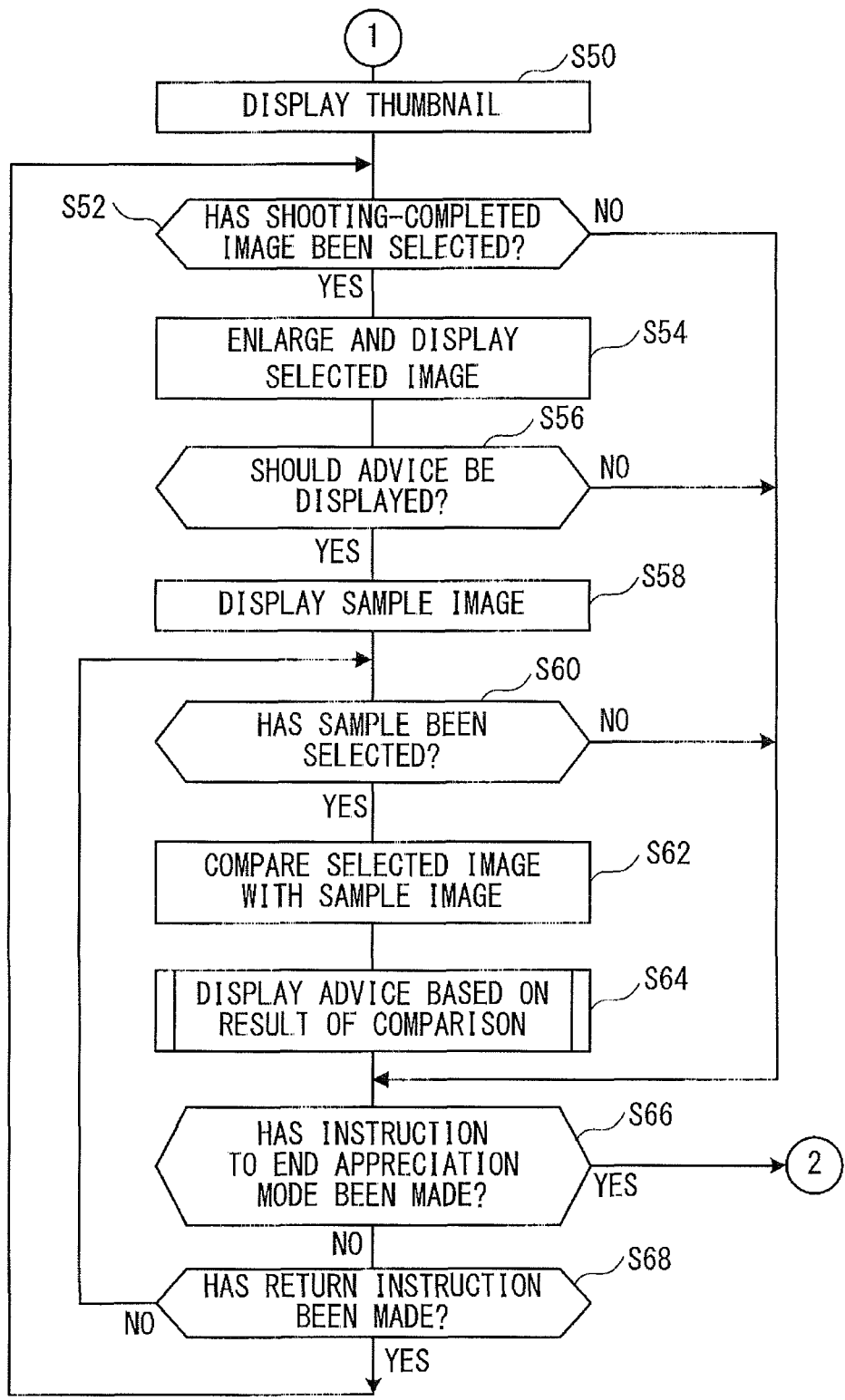
FIG. 3B is a flowchart 2 illustrating a procedure for an advice displaying process.

FIGS. 3A and 3B are flowcharts 1 and 2 each illustrating a procedure for an advice displaying process. The advice displaying process is mainly performed by the control unit 40*a*. First, the functional limit judging unit 53 of the control unit 40*a* determines, as device states of the imaging apparatus 10, a mounted accessory and a functional limit using the device detecting unit 52 (step S10).

The accessory is an illumination flash or is a mounted interchangeable lens in the case of the imaging apparatus 10 being a lens interchangeable camera. The functional limit may be the variable ranges of the diaphragm, shutter speed, and ISO sensitivity of the imaging apparatus 10, or may be the type of installed special shooting or special effect.

The control unit 40a determines whether an operation mode of the imaging apparatus 10 is an viewing mode (step S12). The operation mode of the imaging apparatus 10 may be switched using a mode button included in the operation unit 80. In addition to the viewing mode, the operation mode includes an image shooting mode, a reproduction mode, a communication mode, and the like.

When the control unit 40a determines that the operation mode of the imaging apparatus 10 is not the viewing mode, e.g., determines that the mode is the image shooting mode (No in step S12), the control unit 40a starts the image shooting mode and displays a live view (LV) image on the display unit 75 (step S14). When the control unit 40a determines that the mode of the imaging apparatus 10 is the viewing mode (Yes in step S12), the flow shifts to the processes in FIG. 3B. Details of the viewing mode will be described hereinafter.

While the live view image is being displayed, the control unit 40a detects the motion (camerawork) of a photographer using the motion detecting unit 90, and records motion data in the motion storage unit 92 (step S16). While the live view image is being displayed, the control unit 40a also records the motion of, and a change in, a subject in predetermined areas within the storage unit 60 and/or the RAM 70 (step S18).

While the live view image is being displayed, the control unit 40a determines whether to display advice (step S20). The user chooses by herself/himself whether to display advice. Aside from the user's choice, advice may be automatically displayed in accordance with the situation. Advice may be displayed in the case of, for example, "panning shooting", which depends on the method of moving the imaging apparatus 10 during image shooting. Alternatively, advice may be displayed when the imaging apparatus 10 is used for the first time. When the user wants advice to be displayed, she/he presses an advice display button. The advice display button, which is not illustrated, is included in the operation unit 80.

When the control unit 40a determines that advice is to be displayed (Yes in step S20), the control unit 40a displays a sample image (step S22).

The control unit 40a reads sample image information 66 from the storage unit 60 and displays it on the display unit 75. The control unit 40a may randomly select and display a sample image from among the sample image information 66 in the storage unit 60, or may preferentially display a sample image used in the past. The control unit 40a may cause the image characteristics judging unit 50 to judge the type of a subject in the live view image, and may select, according to sample auxiliary information 67, a sample image with a subject of a type associated with the type of the subject (e.g., a dog) in the live view image, so as to preferentially display such a sample image.

FIG. 6 is an exemplary screen displayed on the display unit 75 in step S22. A live view image L, which is large in size, is displayed at the centre of the screen, and three sample images (SP1, SP2, and SP3) are horizontally arranged below the live view image L. If the photographer does not find a desirable sample image, she/he can sequentially switch sample images. The photographer may call up a desirable sample image registered in advance.

When the photographer watches the screen of the display unit 75 and finds a sample image that she/he wants to use as an ideal example, then she/he selects this sample image. The control unit 40a determines whether the photographer has selected a sample image (step S24). When the photographer ceases the selecting of a sample image (No in step S24), the control unit 40a shifts to step S30.

When the control unit 40a determines that a sample image has been selected (Yes in step S24), the image comparing unit 51, the function comparing unit 54, and the operation comparing unit 57 each compare the selected sample image with the live view image (step S26).

The image comparing unit 51 compares "image characteristics" of the selected sample image with "image characteristics" of the live view image. The image comparing unit 51 obtains the "image characteristics" of the live view image from the image characteristics judging unit 50. The image comparing unit 51 extracts the "image characteristics" of the selected sample image from sample image information 66 and compares the extracted "image characteristics" with the "image characteristics" of the live view image.

The function comparing unit 54 compares a device used for the selected sample image and a device used for the live view image. The function comparing unit 54 obtains device information of the imaging apparatus 10 according to a judgement result provided by the functional limit judging unit 53. The function comparing unit 54 reads information on the device used to shoot the selected sample image from device record information 67a of sample auxiliary information 67, and compares the read information with the obtained device information of the imaging apparatus 10.

The operation comparing unit 57 compares an "operation performed during image shooting" of the selected sample image with an "operation performed during image shooting" of the live view image. As described above, the "operation performed during image shooting" refers to an "operation for making settings (setting operation)" of the imaging apparatus 10 and a "motion made during image shooting" of the imaging apparatus 10.

According to the motion storage unit 92 and the setting detecting unit 55, the operation judging unit 56 judges the "operation performed during image shooting" of the shot image; the operation comparing unit 57 obtains the "operation performed during image shooting" of the live view image according to a judgement result provided by the operation judging unit 56. The operation comparing unit 57 reads a "setting operation" and a "motion made during image shooting" from the setting record information 67b and motion record information 67c of sample auxiliary information 67, and compares the "operation performed during image shooting" of the selected sample image with the "operation performed during image shooting" of the obtained live view image. The control unit 40a displays advice based on the results of the respective comparisons of the characteristics of the images, the devices, and the operations performed during image shooting (step S28).

Figure 4:
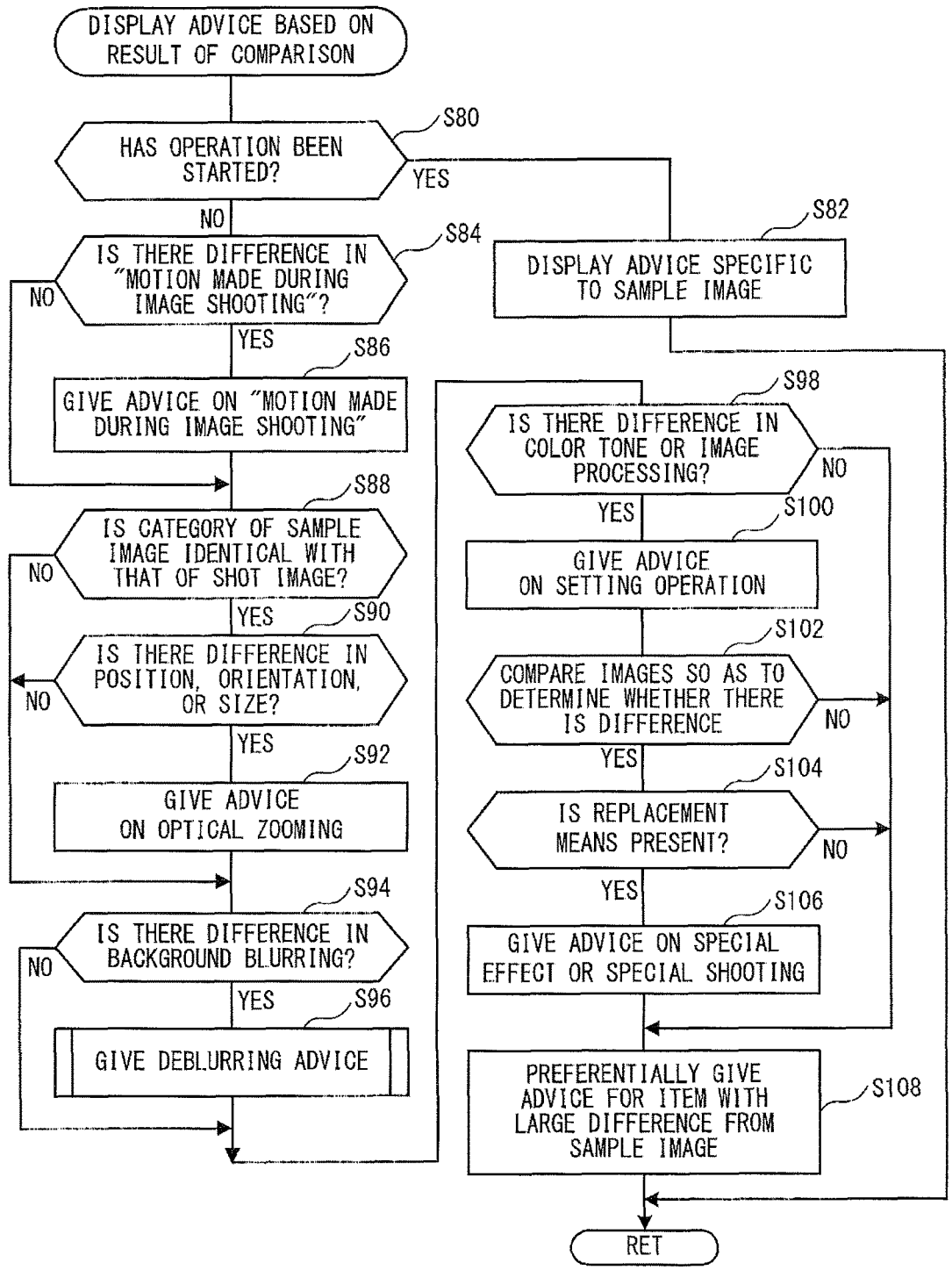
FIG. 4 depicts a subroutine illustrating a procedure for displaying of advice.

FIG. 4 depicts a subroutine for displaying of advice according to a comparison result. The control unit 40a determines whether a current situation is a "prestart" (step S80). "Prestart" refers to a situation in which the imaging apparatus 10 is not set to the image shooting mode or the viewing mode. When the control unit 40a determines that the current situation is "prestart" (Yes in step S80), the control unit 40a displays advice specific to a sample image (step S82). After step S82, the flow returns to the original flowchart. In the case of a sample image that is a portrait, the advice specific to a sample image is advice such as "don't use flash", "blur background", or "change the orientation of the face a little".

When the control unit 40a determines that the current situation is "post-start" (No in step S80), the control unit 40a compares the sample image with the shot image, judges differences between these images according to the result of the comparing, and displays advice based on the differences. The differences include various items, and the following will describe examples of representative differences and corresponding advice.

According to the comparison result, the operation comparing unit 57 determines whether the "motion made during image shooting" included in the "operation performed during image shooting" of the sample image is different from that of the shot image (step S84). As described above, the "motion made during image shooting" refers to the way the imaging apparatus is moved or to a posture used to shoot an image. The operation comparing unit 57 makes comparisons according to motion record information 67c of sample auxiliary information 67 and a result provided by the operation judging unit 56.

When the operation comparing unit 57 determines that there is a predetermined difference in "motion made during image shooting" (Yes in step S84), the advice selecting unit 58 displays advice related to "motion made during image shooting" on the display unit 75 according to a difference from the "motion made during image shooting" of the sample image (step S86). The advice selecting unit 58 searches for proper advice by referring to advice information 68 and displays the advice.

In, for example, a panning shooting mode, when the panning of a shot image is slower than that of a sample image, the advice selecting unit 58 displays advice to increase the panning speed. When the camera angle for the shot image (low angle or high angle) is different from that for the sample image, the advice selecting unit 58 displays the difference.

When the advice selecting unit 58 determines that there is not a predetermined difference in "motion made during image shooting" (No in step S84), the flow shifts to step S88.

Next, the image comparing unit 51 compares characteristics of the sample image with those of the shot image so as to determine whether the category of the sample image is identical with that of the shot image (step S88). A category may be the type of image shooting such as a portrait or a scenic shot, or may be the specific type of a subject such as a child or dog. When the image comparing unit 51 determines that their categories are identical with each other (Yes in step S88), the image comparing unit 51 determines whether there is a difference in position, orientation, or size of a main subject displayed on the screen (step S90).

When the image comparing unit 51 determines that there is a difference in position, orientation, or size of a main subject displayed on the screen (Yes in step S90), the advice selecting unit 58 gives advice on, for example, optical zooming (step S92). When the proportion of an area of the screen occupied by the subject of the shot image is lower than that of an area of the screen occupied by the subject of the sample image, the advice selecting unit 58 gives advice for a zoom in instruction; otherwise, the advice selecting unit 58 displays advice for a zoom out instruction.

When the image comparing unit 51 determines that the categories are not identical with each other (No in step S88), the flow shifts to step S94. This is because it makes no sense to conform the position and size of the subject of the shot image to those of the subject of the sample image when the categories of the subjects are different from each other. When the image comparing unit 51 determines that there is no difference in position, orientation, or size (No in step S90), the flow shifts to step S94. After the process of step S92 is performed, the flow may shift to step S94.

The image comparing unit 51 determines whether there is a difference in background blurring between the sample image and the shot image (step S94). According to sample image information 66 and the result of the judgment made by the image characteristics judging unit 50, the image comparing unit 51 makes a determination as to a difference in background blurring.

When the image comparing unit 51 determines that there is a difference in background blurring between the sample image and the shot image (Yes in step S94), the advice selecting unit 58 gives deblurring advice (step S96).

Figure 5:
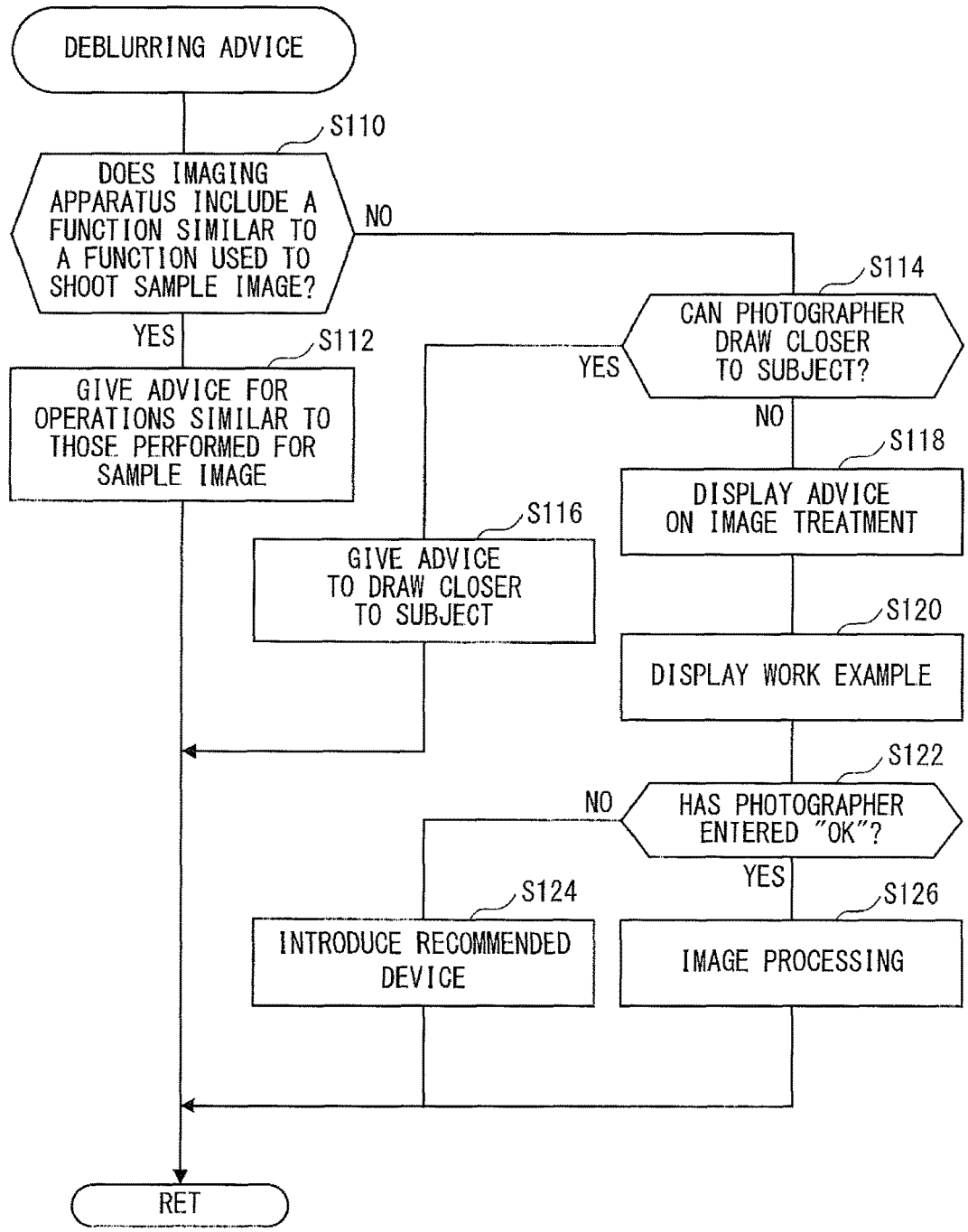
FIG. 5 depicts a subroutine illustrating a procedure for providing deblurring advice.

FIG. 5 depicts a subroutine illustrating a procedure for providing deblurring advice. The function comparing unit 54 determines whether the current imaging apparatus 10 includes a function similar to a function used to shoot a sample image (step S110). That is, the function comparing unit 54 determines whether parameters of the imaging apparatus 10 required for deblurring (in particular, the focal length, diaphragm, and shutter speed of a lens) can be set to values equal to the values used to shoot the sample image. The mounted accessory and the functional limit, both of which are judged in step S10 as the device states of the current imaging apparatus 10 by the functional limit judging unit 53, are used. By referring to the result of the judgment made by the functional limit judging unit 53 and device record information 67a of sample auxiliary information 67, the function comparing unit 54 compares the "functions" for the sample image with the "functions" for the shot image.

When the function comparing unit 54 determines that there are sufficient functions and that operations similar to those performed for the sample image can be performed (Yes in step S110), the advice selecting unit 58 refers to advice information 68 and selects advice for the operations similar to those performed for the sample image, and the control unit 40a displays the selected advice on the display unit 75 (step S112). When, for example, an F value is brighter than the F value for the sample image, the advice selecting unit 58 gives advice to decrease the F value.

When the function comparing unit 54 determines that there are no functions similar to those for the sample image (No in step S110), the operation comparing unit 57 determines whether the photographer can draw closer to a subject (step S114). This is because, when the background blurring of the shot image is less than that of the sample image, unless the current distance between the subject and the photographer is the shortest possible, she/he can increase the blurring of the background by shooting an image at a position closer to the subject.

When the operation comparing unit 57 determines that the photographer can draw closer to the subject (Yes in step S114), the advice selecting unit 58 selects advice to draw closer to the subject from advice information 68, and the control unit 40a displays the selected advice on the display unit 75 (step S116).

When the operation comparing unit 57 determines according to the value of a current image shooting distance that the photographer cannot draw closer to the subject (No in step S114), the advice selecting unit 58 selects, for example, advice for image treatment from advice information 68, and the control unit 40a displays the advice on the display unit 75 (step S118). The image treatment is, for example, a process of synthesizing one image by patching images of a main subject and background that are separately shot. The image treatment is performed by the image treating unit 44.

The control unit 40a displays an image obtained by treating a live view image on the display unit 75 as a work example together with the live view image (step S120). The image treating unit 44 creates, as the work example, a composite image from the live view image.

The control unit 40*a* determines whether the photographer, who saw the treatment-based work example, has entered "OK" (step S122). When the control unit 40*a* determines that the photographer has entered "OK" (Yes in step S122), the control unit 40*a* displays the image treated by the image treating unit 44 on the display unit 75 as a live view image (step S126).

When the control unit 40*a* determines that the photographer has not entered "OK" (No in step S122), the advice selecting unit 58 introduces a recommended device (step S124). This is because blurring largely depends on a lens and an f number, and there are limitations to image treatments and adjustments for the setting of image shooting conditions. After the processes of steps S116, S124, and S126 are performed, the flow shifts to step S98 in FIG. 4.

In the following, descriptions will be given by referring to FIG. 4 again. When the image comparing unit 51 determines that there is no difference in background blurring between the sample image and the shot image (No in step S94), the flow shifts to step S98. The image comparing unit 51 determines whether there is a difference in color tone and image processing between the sample image and the shot image (step S98).

When the image comparing unit 51 determines that there is a difference in color tone or image processing (Yes in step S98), the advice selecting unit 58 selects advice on a proper setting operation (step S100), and the selected advice is displayed. In addition, after all ordinary difference adjustments such as setting operations and device operations are performed, the advice selecting unit 58 compares the images so as to determine whether there is a difference (step S102).

After all of the ordinary difference adjustments such as setting operations and device operations are performed, when the advice selecting unit 58 determines that a difference still remains through the comparing of the images (Yes in step S102), the control unit 40*a* determines whether replacement means is present (step S104).

The replacement means refers to using a special effect and/or special shooting installed on the imaging apparatus 10. This is because the color tone and the appearance of the screen may be changed using the special effect and/or the special shooting. The special effect is, for example, soft focus processing or contrast enhancement processing. The special shooting is, for example, image shooting wherein a plurality of images each resulting from a different point of focus are synthesized so as to generate a sharp image on the entirety of the screen.

If the photographer has never used the special effect or the special shooting, using them will provide a good opportunity for the photographer to reproduce a color tone and atmosphere equivalent to those for the sample image, and hence advice may be actively given. The control unit 40*a* may save in the storage unit 60 the history of operations on the imaging apparatus 10 so that the operation history can be referred to.

When the control unit 40*a* determines that replacement means is present (Yes in step S104), the advice selecting unit 58 refers to advice information 68 so as to select, as advice, the type and item of a special effect or special shooting, if any, that is capable of reproducing a color tone and atmosphere equivalent to those for the sample image (step S106).

FIG. 7 illustrates an exemplary screen on which the advice of step S102 is displayed. Advice AD1, "SOLUTION WITH REPLACEMENT MEANS", is displayed on the screen together with a live view image L and a sample image SP4. AD2 is a button to cause "REPLACEMENT" to be performed. In response to the photographer touching AD2, an image obtained by applying a predetermined special effect to the live view image L or an image obtained through special shooting is displayed.

When the image comparing unit 51 determines that there is no difference in color tone or image processing (No in step S98), when a judgement of No is made in step S102, or when the control unit 40*a* determines that replacement means is not present (No in step S104), the flow shifts to step S108.

In the flowchart of FIG. 4, an instruction to execute replacement means is given at an end of the flow. However, settings may be made such that replacement means is executed before an image is shot, and the special effect may be operated simultaneously with ordinary setting operations. For example, an arrangement may be made such that, in a case where background blurring identical with that of the sample image cannot be achieved due to a difference in an image shooting device, when the diaphragm reaches an open-side maximum value and then a diaphragm selection button is operated in a direction in which the diaphragm opens, a blurring effect mode of the special effect (e.g., soft focus processing) is set. This may enhance background blurring through a continuous operation.

The advice selecting unit 58 searches for an item with a large difference from the sample image and selects advice for the item. The control unit 40*a* preferentially displays the advice for the item with a large difference (step S108).

With reference to steps S80-S102 described above, descriptions have been given of advice for representative items of "motion made during image shooting", "category", "background blurring", and "color tone/image processing", but advice may be given for other items. However, displaying advice for every item with a difference may create a complicated situation that goes against the user's intentions. Giving advice preferentially for an item with a large difference as in step S108 may efficiently make a shot image close to a sample image. Alternatively, advice may be given for only a predetermined number of items (e.g., 2 items) ordered so that the item with the largest difference comes first.

Descriptions will be given by referring to FIG. 3A again. When the control unit 40*a* determines that the advice display button has not been pressed (No in step S20), the flow shifts to step S30. The control unit 40*a* determines whether the photographer has performed some sort of operation using the operation unit 80 (step S30). When the control unit 40*a* determines that some sort of operation has been performed (Yes in step S30), the image-shooting control unit 48 changes, for example, a parameter according to the operation (step S32). When the control unit 40*a* determines that no sort of operation has been performed (No in step S30), the flow shifts to step S34.

The control unit 40*a* determines whether an image shooting instruction has been given using the release button included in the operation unit 80 (step S34). When the control unit 40*a* determines that an image shooting instruction has not been given (No in step S34), the flow shifts to step S42.

When the control unit 40*a* determines that an image shooting instruction has been given (Yes in step S34), the control unit 40*a* performs an image shooting process (step S36). The record control unit 42 records a shot image and relevant information in the storage unit 60 (step S38). The relevant information is, for example, the type of an image shooting device, setting operations (image shooting conditions), and motions made during image shooting (the way the imaging apparatus is held or moved). The control unit 40a records, as the "motions made during image shooting", the information recorded in the motion storage unit 92 in step S16. The shot image and the relevant information are recorded in the storage unit 60 as shot image information 64.

The advice selecting unit 58 displays advice information on an as-needed basis or according to an instruction (step S40). For example, advice information may be displayed when the process of displaying the advice of step S28 is performed by selecting a sample image before image shooting is performed. As an example, when panning shooting is performed using a sample image, the way the apparatus is moved to perform the panning shooting, i.e., the actually performed image shooting, is compared with the way the apparatus would be moved to shoot the sample image, so as to display advice. When image shooting is performed without displaying advice, the control unit 40a does not need to display advice.

The control unit 40a determines whether the apparatus has been put in a standby state when the operation unit 80 is not operated for a predetermined period of time (step S42). When the control unit 40a determines that the apparatus has not been put in the standby state (No in step S42), the flow returns to step S12. When the control unit 40a determines that the imaging apparatus 10 has been put in the standby state (Yes in step S42), the imaging apparatus 10 shifts to a power saving mode (step S44).

Descriptions start with step S12 again. When the control unit 40a determines that the imaging apparatus 10 is in the viewing mode (Yes in step S12), the flow shifts to step S50 in FIG. 3B. The viewing mode is a mode for displaying advice that corresponds to a shooting-completed image. This is because learning a technique for making a shooting-completed image close to the sample image is beneficial for next image shooting.

The control unit 40a displays a thumbnail image for the shooting-completed image on the display unit 75 (step S50). The thumbnail image is read from shot image information 64 within the storage unit 60. The photographer scrolls through shooting-completed images using the operation unit 80 so as to search for a shooting-completed image to be compared with the sample image. When the photographer finds an image to be compared, she/he presses a button to designate the selection of the image.

The control unit 40a determines whether a shooting-completed image to be compared with the sample image has been selected (step S52). When the control unit 40a determines that a shooting-completed image has not been selected (No in step S52), the flow shifts to step S66. When the control unit 40a determines that a shooting-completed image has been selected (Yes in step S52), the selected image, which is in a thumbnail state, is enlarged and displayed by the control unit 40a (step S54).

The control unit 40a determines whether an advice display instruction has been given (step S56). When a predetermined button included in the operation unit 80 is pressed, the control unit 40a determines that the advice display instruction has been made. When the control unit 40a determines that the advice display instruction has been given (Yes in step S56), the control unit 40a displays a sample image using sample image information 66 (step S58). Instead of the live view image L, the selected shooting-completed image is displayed on the screen as illustrated in FIG. 6. In accordance with an instruction from the operation unit 80, the control unit 40a switches a sample image to be displayed.

When the control unit 40a determines that the advice display instruction has not been given (No in step S56), the flow shifts to step S66.

The control unit 40a determines whether a sample image has been selected (step S60). When the control unit 40a determines that a sample image has not been selected (No in step S60), the flow shifts to step S66.

When the control unit 40a determines that a sample image has been selected (Yes in step S60), the image comparing unit 51 compares the selected shooting-completed image with the selected sample image (step S62). The process performed in step S62 is equivalent to that performed in step S26, and descriptions of step S62 are omitted herein.

The advice selecting unit 58 selects advice according to the result of the comparison, and the control unit 40a displays the advice (step S64). The displaying of advice based on the result of the comparison is the processes of the subroutines depicted in FIGS. 4 and 5. The subroutines depicted in FIGS. 4 and 5 have already been described with reference to step S28.

The control unit 40a determines whether the photographer has given an instruction to end the viewing mode (step S66). When the control unit 40a determines that an instruction to end the viewing mode has been given (Yes in step S66), the flow shifts to step S42. When the control unit 40a determines that the photographer has not given an instruction to end the viewing mode (No in step S66), the control unit 40a determines whether the photographer has given a return instruction (step S68). When the control unit 40a determines that the photographer has not given the return instruction (No in step S68), the flow returns to step S60. When the control unit 40a determines that the photographer has given the return instruction (Yes in step S68), the flow returns to step S52.

As described above, the imaging apparatus 10 in accordance with the first embodiment selects a sample image to be used as an ideal example, thereby displaying advice as to what change should be made to the current image shooting conditions in order to shoot an image that is similar to the sample image. Shooting an image in accordance with the advice allows the user to take a picture that is close to an intended or desired image. In addition, various image shooting techniques can be learned from sample images.

A sample image also includes information on "motions made during image shooting (the way the imaging apparatus is held or moved)" which are required to shoot the sample image, so that the user can get advice on the propriety of her/his "motions made during image shooting". It would be difficult to master such "motions made during image shooting" without taking, for example, a photography seminar, but using the imaging apparatus 10 in accordance with the first embodiment allows users to learn techniques for panning shooting that would be taught in a photography seminar, i.e., techniques that would be difficult for beginners to use.

Figure 8:
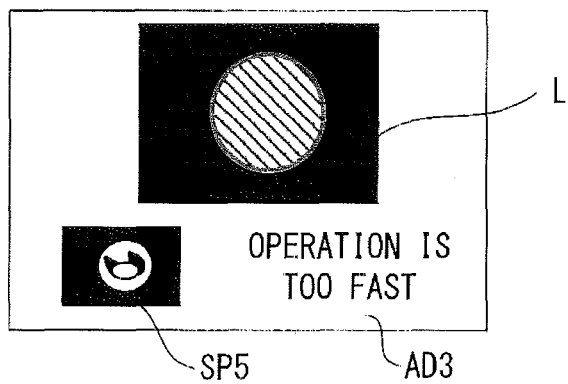
FIG. 8 illustrates an example of a special advice display screen.

FIG. 8 illustrates an example of a special advice display screen. FIG. 8 depicts an exemplary screen achieved when an endoscope camera that is an example of the imaging apparatus 10 is inserted into the body. The sample image is a moving image that is seen when a camera provided at a tip of a scope is inserted into the body. A live view image L is displayed on a wide area of the screen while a sample image SP5 and advice AD3 are displayed. As an example, a caution "OPERATION IS TOO FAST" is displayed as advice AD3.

In this case, the operation comparing unit 57 compares the insertion speed for the current image shooting with the speed of the insertion of the scope into the body that is included in motion record information 67c of a sample image, thereby determining whether the insertion speed for the current image shooting is excessively fast. Then, in response to the determination made by the operation comparing unit 57, the advice selecting unit 58 selects advice such as advice AD3 from advice information 26, thereby displaying the advice as depicted in FIG. 8.

According to the first embodiment described above, the imaging apparatus 10 can be provided that provides total support for image shooting so that the image close to an ideal example image can be shot.

Second Embodiment

Figure 9B:
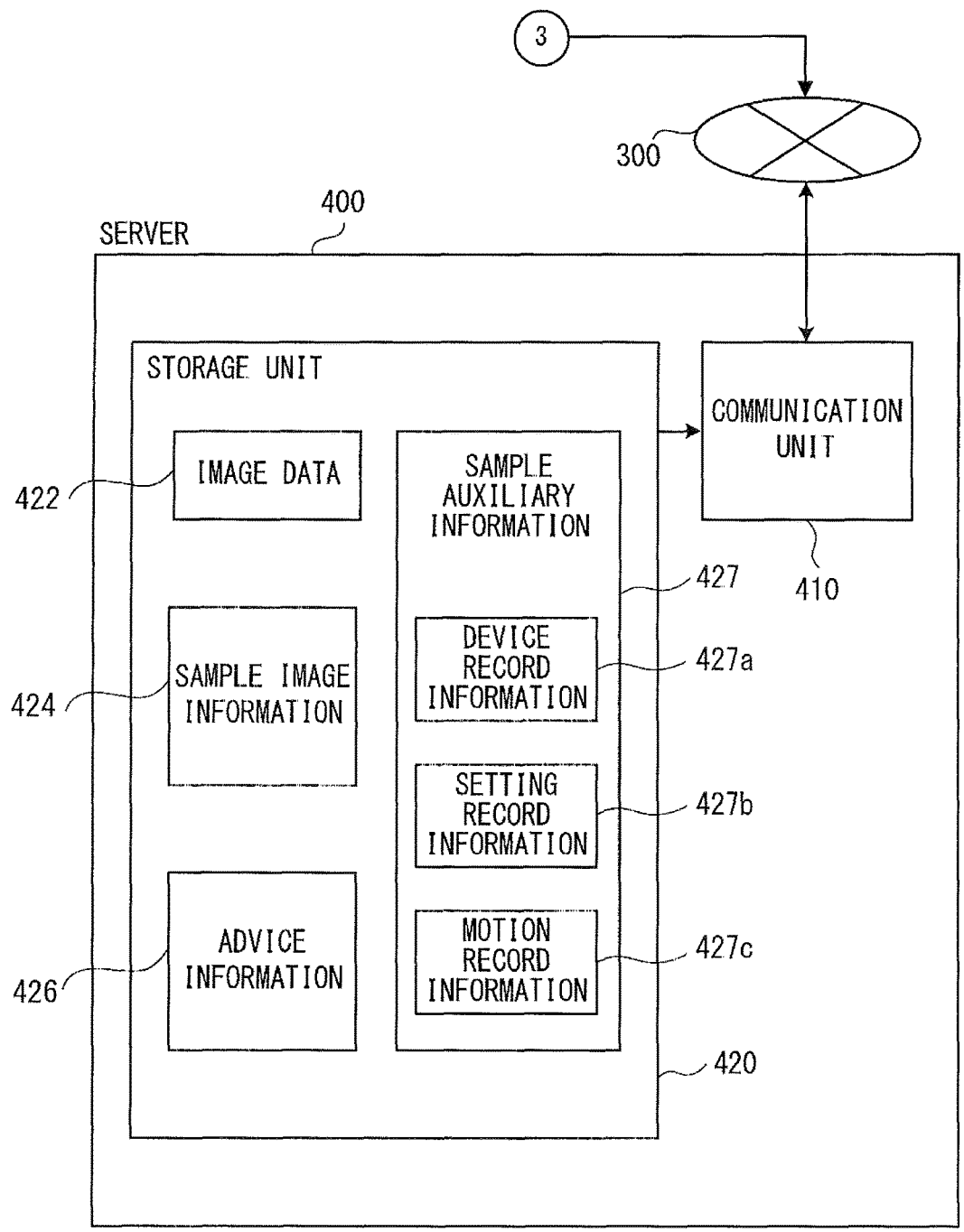
FIG. 9B is a system diagram illustrating a configuration in accordance with a second embodiment.

A second embodiment is an example in which advice is displayed by obtaining, via a network, a sample image and advice information stored in a server. FIGS. 9A and 9B are a system diagram illustrating a configuration in accordance with the second embodiment.

In this example, a camera unit 120 (optical system) and a main body unit 200 serve together as an imaging apparatus 100, and the camera unit 120 is separated from the main body unit 200. The camera unit 120 and the main body unit 200 constitute the imaging apparatus 100 by communicating with each other over, for example, Wi-Fi or Bluetooth®. The main body unit may be a smartphone. The main body unit 200 is connected via a network 300 to a server 400 in which sample images are saved. The main body unit 200 uses a sample image and advice information obtained from the server 400 through a communication.

The imaging apparatus 100 consists of the camera unit 120 and the main body unit 200. The camera unit 120 includes an imaging unit 130 and a communication unit 140. As with the imaging unit 20 of the first embodiment, the imaging unit 130 includes: an optical system that forms a subject image; and a preprocessing unit that includes an imaging element to perform photoelectric conversion of a formed optical image, and that performs AD conversion and/or AGC of an image signal from the imaging element. The communication unit 140 wirelessly (over Wi-Fi or Bluetooth®) communicates various types of data with the main body unit 200. The communication unit 140 transmits to the main body unit 200 an image data after preprocessing and receives, from the main body unit 200, control signals for the imaging unit 130, e.g., a control signal for the imaging element and an adjustment signal for the zoom and diaphragm of the optical system.

The hardware configuration of the main body unit 200 is equivalent to the configuration depicted in FIG. 1 with the imaging unit 20 removed therefrom, and the description of such a hardware configuration is omitted herein. The main body unit 200 includes an image processing unit 230, a control unit 240a, a storage unit 260, a display unit 275, an operation unit 280, a motion detecting unit 290, a motion storage unit 292, a main body communication unit 294, and an external communication unit 296.

The image processing unit 230, the display unit 275, the operation unit 280, the motion detecting unit 290, and the motion storage unit 292 are functional units that are respectively equivalent to the image processing unit 30, display unit 75, operation unit 80, motion detecting unit 90, and motion storage unit 92 of the first embodiment, and descriptions of such functional units are omitted herein.

The control unit 240a, which is achieved by an unillustrated CPU according to a read control program, comprehensively controls the main body unit 200. The control unit 240a includes a record control unit 242, an image treatment unit 244, a display control unit 246, and an image-shooting control unit 248.

The record control unit 242, the image treatment unit 244, the display control unit 246, and the image-shooting control unit 248 are functions that are respectively equivalent to the record control unit 42, image treating unit 44, display control unit 46, and image-shooting control unit 48 of the first embodiment, and descriptions of such functions are omitted herein.

In addition, the control unit 240a includes an image characteristics judging unit 250, an image comparing unit 251, a device detecting unit 252, a functional limit judging unit 253, a function comparing unit 254, a setting detecting unit 255, an operation judging unit 256, an operation comparing unit 257, and an advice selecting unit 258. The image characteristics judging unit 250 to the advice selecting unit 258 are functions respectively equivalent to the image characteristics judging unit 50 to the advice selecting unit 58 of the first embodiment, and descriptions of such functions are omitted herein.

In addition to the control program described above, the storage unit 260 stores shot image information 264 recorded by the control unit 240a. The main body communication unit 294 wirelessly communicates various types of data with the communication unit 140 of the camera unit 120. The external communication unit 296 communicates with the server 400 via the network 300. In particular, the external communication unit 296 transmits to the server 400 a request for sample image information and advice information, and receives the transmitted sample image information and advice information.

The server 400 includes a communication unit 410 and a storage unit 420. The server 400 may be, for example, a server that manages image posting sites and images of SNSs. The communication unit 410 communicates with a terminal connected to the network 300.

The storage unit 420 stores image data 422, sample image information 424, advice information 426, and sample auxiliary information 427. Image data 422 is data on a shot image provided or posted by a member. Data from among image data 424 that has been authorized by the photographer to be used as a sample image is sample image information 424.

As with sample image information 66 described above, sample image information 424 is data on an image shot in advance and presented to the photographer as an ideal example. Sample image information 424 includes sample auxiliary information 427. As with sample auxiliary information 67, sample auxiliary information 427 includes device record information 427a, setting record information 427b, and motion record information 427c, all of which are obtained when each sample image is shot.

As with advice information 68, advice information 426 is information for advising the photographer of various image shooting methods to make a shot image close to a sample image.

In the first embodiment described above, sample images and advice information are stored in the imaging apparatus 10, and, when a photographer gives an advice display instruction (step S20 in FIG. 3A and step S56 in FIG. 3B), necessary information is read from the imaging apparatus 10 so as to display advice.

By contrast, in the second embodiment, the imaging apparatus obtains a sample image and advice information from the server 400 so as to display advice. Except for the fact that sample images and advice information are obtained via a network, the advice displaying process performed by the imaging apparatus 100 of the second embodiment is the same as the advice displaying process of the first embodiment. The advice displaying process performed by the imaging apparatus 100 of the second embodiment is substantially the same as the advice displaying process of the first embodiment (FIGS. 3A, 3B, and 4-5), and descriptions thereof are omitted herein.

According to the second embodiment described above, the imaging apparatus 100 can be provided that provides total support for image shooting so that the image close to an ideal example image can be shot.

In addition to the imaging apparatus 100 in accordance with the second embodiment uses sample images and advice information stored in a server, thereby enabling use of a larger amount of newer information than in the case of an imaging apparatus having information stored therein.

With reference to the embodiments described above, the control unit 40a (or 240a) was described in regard to software processing, but a portion of or the entirety of the control unit 40a (or 240a) may consist of hardware.

In addition, the present invention is not limited to the above-described embodiments as they are, but may be embodied by deforming constituents within a scope not deviating from the gist of the invention at an execution step. In addition, various inventions can be made by appropriately combining a plurality of constituents that have been disclosed in the above embodiments. For example, all the constituents that have been disclosed in the embodiments may be appropriately combined. Further, constituents in different embodiments may be appropriately combined. It should be understood that various modifications and applications can be made without departing from the scope and the spirit of the invention.

EXPLANATIONS OF LETTERS OR NUMERALS 10, 100 Imaging apparatus
20, 130 Imaging unit
30, 230 Image processing unit
40 CPU
40a, 240a Control unit
42, 242 Record control unit
44, 244 Image treatment unit
46, 246 Display control unit
48, 248 Image-shooting control unit
50, 250 Image characteristics judging unit
51, 251 Image comparing unit
52, 252 Device detecting unit
53, 253 Functional limit judging unit
54, 254 Function comparing unit
55, 255 Setting detecting unit
56, 256 Operation judging unit
57, 257 Operation comparing unit
58, 258 Advice selecting unit
60, 420 Storage unit
64, 264 Shot image information
66, 426 Sample image information
67, 427 Sample auxiliary information
68, 428 Advice information
70 RAM
75, 275 Display unit
80, 280 Operation unit
90, 290 Motion detecting unit
92, 292 Motion storage unit
120 Camera unit
200 main body unit

What is claimed is:

1. An imaging apparatus that includes at least an imaging unit and an operation unit, the imaging apparatus comprising:
an image comparing unit that compares a shot image shot by a photographer with a sample image;
a device comparing unit that compares a device used when the shot image was shot with a device used when the sample image was shot; and
an advice unit that gives the photographer advice on device information to make the shot image close to the sample image according to comparison results provided by the image comparing unit and the device comparing unit.

2. The imaging apparatus according to claim 1, comprising:
a function comparing unit that compares information indicating a capability of a device used for the shot image or a cooperative device operated in cooperation with the device with information indicating a capability of a device used for the sample image or a cooperative device operated in cooperation with the device, wherein
the advice unit further selects the advice in consideration of a comparison result provided by the function comparing unit.

3. The imaging apparatus according to claim 1, wherein when an operation equivalent to an operation performed for the sample image is incapable of being performed during image shooting, the advice unit selects advice on replacement with a special effect.

4. A server that communicates with a smartphone including at least an image comparing unit that compares a shot image shot by a photographer with a sample image, a device comparing unit that compares a device used when the shot image was shot with a device used when the sample image was shot, and an advice unit that gives the photographer advice on device information to make the shot image close to the sample image according to comparison results provided by the image comparing unit and the device comparing unit, wherein
information of at least one of the sample image used by the image comparing unit of the smartphone, the information of the device used when the sample image was shot used by the device comparing unit of the smartphone, and the information of the advice used by the advice unit of the smartphone is transmitted to the smartphone.

5. A control method to be used for an imaging apparatus that includes at least an imaging unit and an operation unit, the control method comprising:
an image comparing step of comparing a shot image shot by a photographer with a sample image;
a device comparing step of comparing a device used when the shot image was shot and a device used when the sample image was shot; and
a step of giving the photographer advice on device information to make the shot image close to the sample image according to comparison results provided by the image comparing step and the device comparing step.

6. A control method of a server that communicates with a smartphone including at least an image comparing unit that compares a shot image shot by a photographer with a sample image, a device comparing unit that compares a device used when the shot image was shot with a device used when the sample image was shot, and an advice unit that gives the photographer advice on device information to make the shot image close to the sample image according to comparison results provided by the image comparing unit and the device comparing unit, wherein
- information of at least one of the sample image used by the image comparing unit of the smartphone, the information of the device used when the sample image was shot used by the device comparing unit of the smartphone, and the information of the advice used by the advice unit of the smartphone is transmitted to the smartphone.

\* \* \* \* \*